(No Model.) 4 Sheets—Sheet 3.
J. V. GANE.
MACHINE FOR MAKING BRUSHES.
No. 378,132. Patented Feb. 21, 1888.
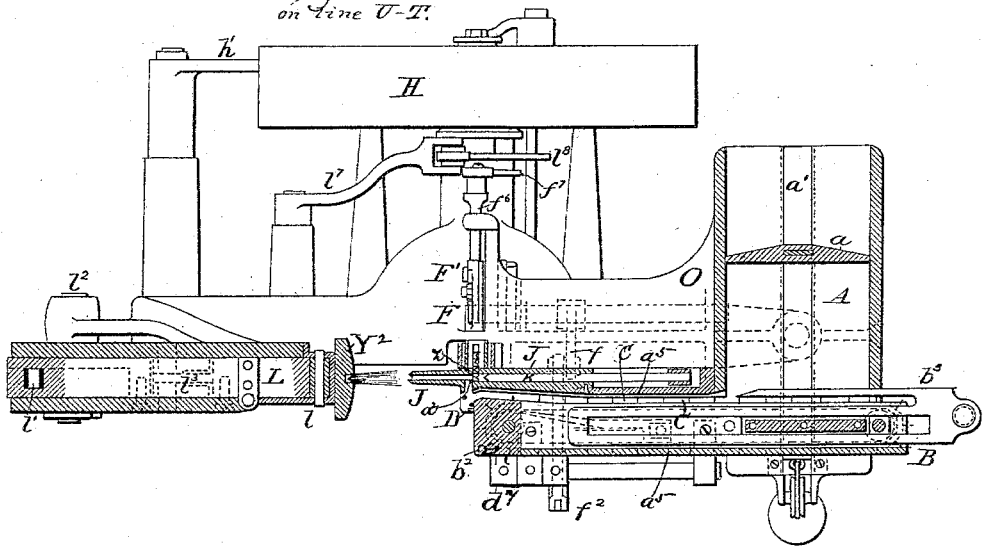
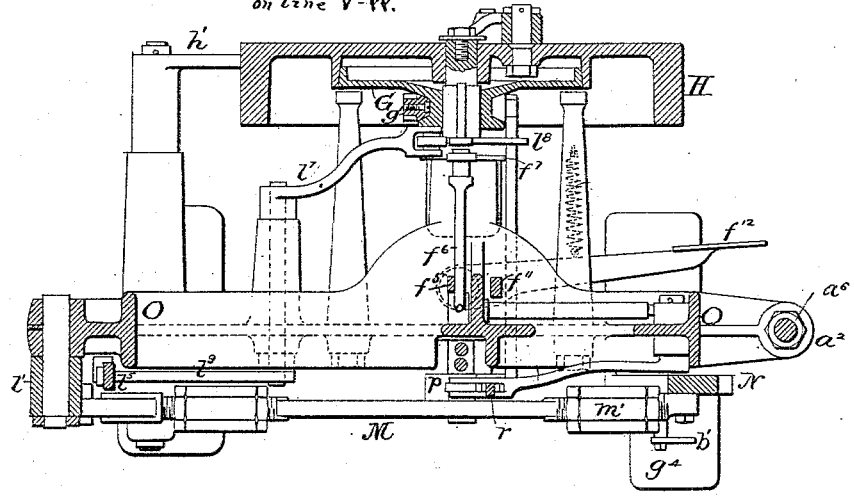
Witnesses:
James F. DuHamel
F. T. Chapman
Inventor:
Jean Victor Gane,
By P. T. Dodge
Atty.

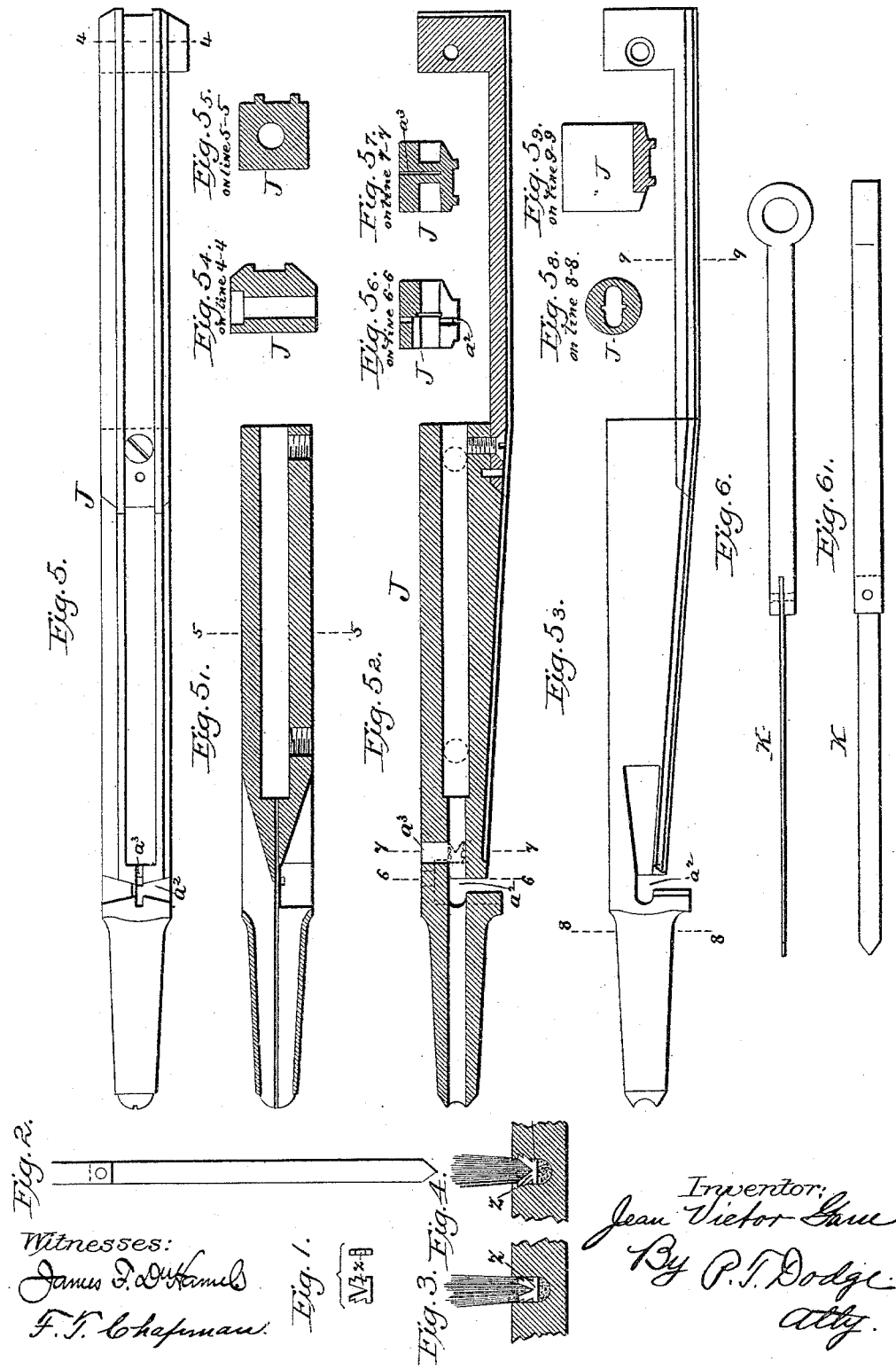

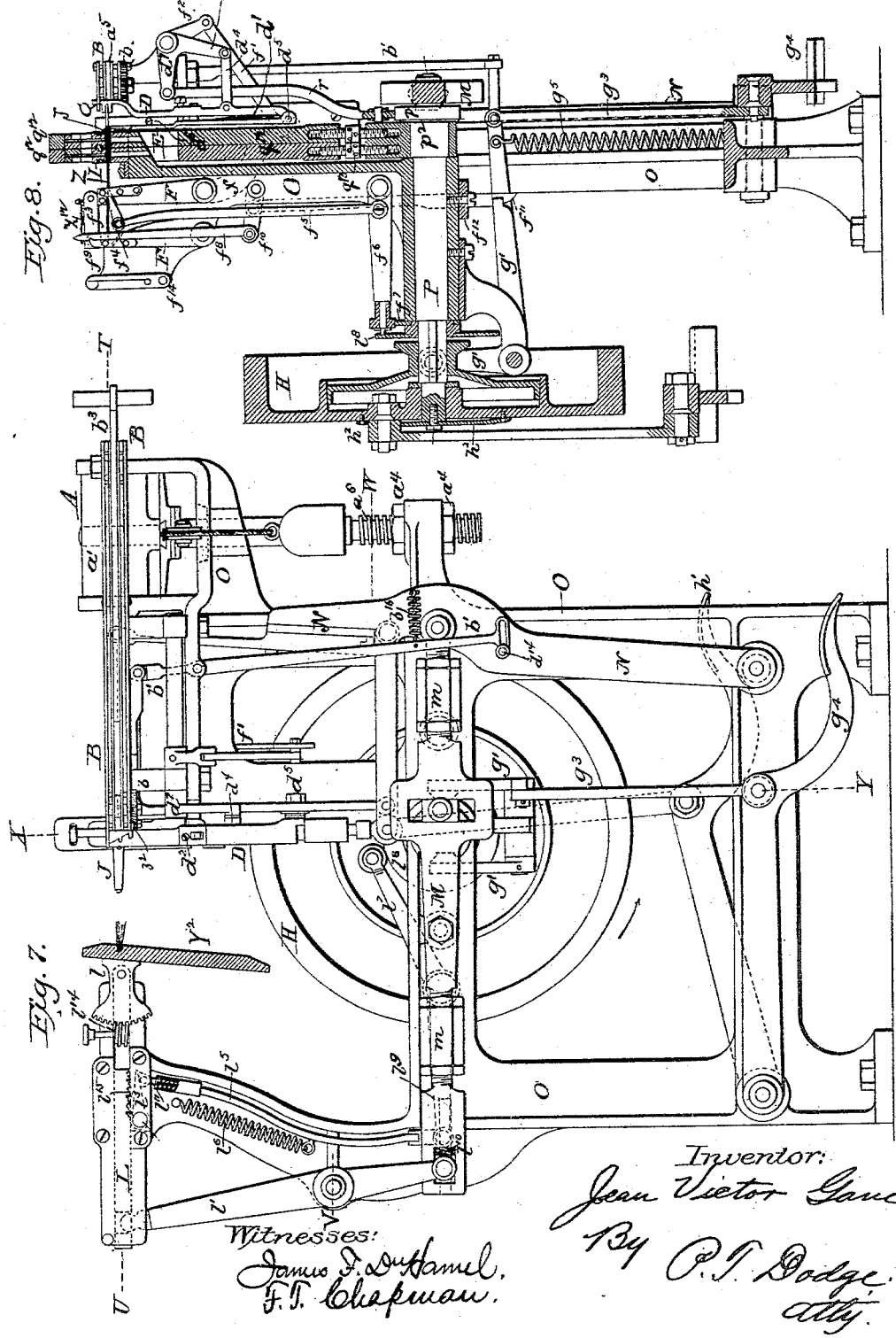

(No Model.) 4 Sheets—Sheet 4.
J. V. GANE.
MACHINE FOR MAKING BRUSHES.
No. 378,132. Patented Feb. 21, 1888.
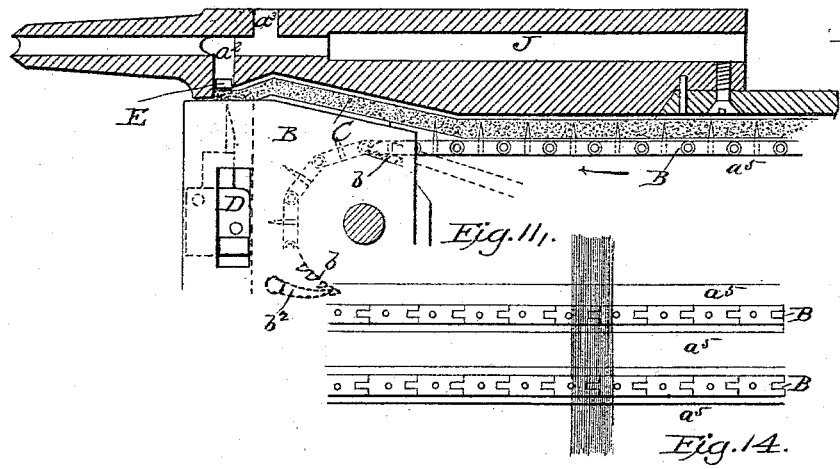
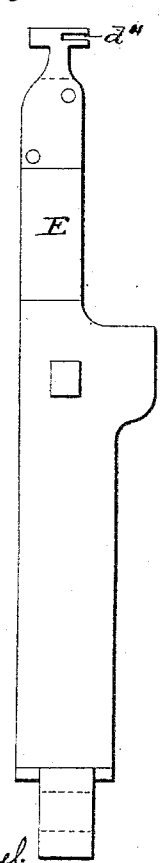
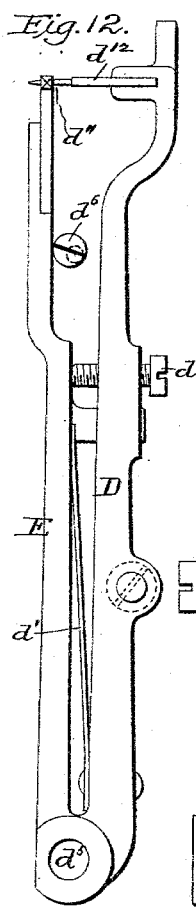
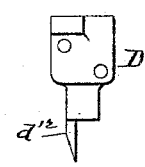
Witnesses:
James F. Duhamel
F. T. Chapman
Inventor:
Jean Victor Gane
By P. T. Dodge
Atty.

UNITED STATES PATENT OFFICE.

JEAN VICTOR GANE, OF PARIS, FRANCE, ASSIGNOR TO FREDERICK JOHN PAGE AND CHARLES FOUNTAIN PAGE, OF NORWICH, ENGLAND.

MACHINE FOR MAKING BRUSHES.

SPECIFICATION forming part of Letters Patent No. 378,132, dated February 21, 1888.

Application filed August 29, 1887. Serial No. 248,178. (No model.) Patented in France January 26, 1877, No. 115,504, and May 2, 1877, No. 116,974; in England February 26, 1877, No. 783; in Belgium February 28, 1877, No. 41,483; in Italy March 5, 1877, XII, 9,035, and in Austria-Hungary September 11, 1877, No. 22,035.

*To all whom it may concern:*

Be it known that I, JEAN VICTOR GANE, of Paris, in the Republic of France, have invented certain Improvements in the Manufacture of Brushes and Brooms and in Machinery and Apparatus Employed Therein, (patented in England, No. 783, February 26, 1877; in France, No. 115,504, January 26, 1877, and No. 116,974, May 2, 1877; in Belgium, No. 41,483, February 28, 1877; in Italy, No. 9,035, March 5, 1877, General Register, vol. 12; in Austria-Hungary, No. 22,035, September 11, 1877,) of which the following is a specification.

My invention has reference to means for the manufacture of all classes of brushes in which the bristles are thrust into holes or seats in the brush-body.

The aim of the invention is to produce an automatic machine by which the bristles may be separated into tufts or bunches thrust into the previously-bored blocks and firmly secured in position thereon.

The machine embraces as its fundamental features a tubular needle and inserting-blade, which may also be used in hand-machines, means for separating the bristles and delivering the tufts to a transverse opening in the side of the needle, means for cutting from sheet metal fastening devices termed "anchors," and for delivering these anchors into the needle behind the tufts, and a reciprocating anvil for advancing the anchors against the tufts, whereby the latter are doubled over the anchors and driven therewith through the needle and into the seats or sockets in the body, and the anchor finally expanded to hold them in place. Means are provided for suitably sustaining the brush-stock during the action of the inserting devices, imparting motion to the various operative parts, and provision is made for adjusting the various parts in relation to each other in order to adapt the machine for the manufacture of different classes of brushes.

I have represented in the accompanying drawings a machine having my invention embodied therein in its most approved form; but it is to be understood that certain of the leading devices are applicable in connection with other details and that the driving mechanism may be modified at will.

In the accompanying drawings, Figure 1 represents a side and an edge view of the anchor which I employ to secure the bristles in place. Fig. 2 is a side view of the inserter-blade by which the anchors are driven to their places and expanded to engage the walls of the opening. Figs. 3 and 4 are cross-sections through a brush-body with a single tuft therein, the anchor being shown before and after its expansion. Fig. 5 is a side view of the tubular needle. Fig. 5' is a longitudinal section through the forward end of the same. Fig. $5^2$ is a horizontal axial section through the same. Fig. $5^3$ is a top plan view of the same. Figs. $5^4$, $5^5$, $5^6$, $5^7$, $5^8$, and $5^9$ are transverse sections of the same on the lines thereon indicated. Fig. 6 is a side elevation, and Fig. 6' is a top plan view, of the inserter-needle. Fig. 7 is a side elevation of the entire machine. Fig. 8 is a vertical transverse section on the line X Y of Fig. 7. Fig. 9 is a horizontal section on the line U T of Fig. 7. Fig. 10 is a horizontal section on the line V W of Fig. 7. Fig. 11 is a portion of the mechanism for feeding the bristles. Fig. 11' is a side elevation of the same. Figs. 12, 13, and 14 are views in elevation of the device for dividing and feeding the bristles or tufts. Fig. 15 is a top plan view of the same.

In order that the construction and operation of my machine may be the more readily understood, I will first call attention to the mode of fixing the tufts in the stock or body of the brush, attention being directed to Figs. 1, 3, and 4, in which $z$ represents a flat metallic plate punched from sheet metal with serrated edges and with a central notch or incision in one side. This device is originally made of such width that it may be readily inserted endwise into the hole or socket. It is applied to the middle of the tuft, the latter folded or doubled over it, and then the end of the tuft inclosing the anchor thrust home to its seat in the hole, as shown in Fig. 3, after which the anchor is expanded laterally in such manner that its serrated edges engage in the walls of the hole and keep it firmly in place, so that it serves in turn to hold the tuft, as shown in Fig. 4.

I employ as the basis of my machine the tubular needle J, such as represented in Figs. 5 to 5⁹, having in one side a transverse slot or opening, $a^2$, into which the bristles may be laid at a middle point in their length across the central bore or opening. This needle is further provided on the opposite side and in rear of the tuft-opening with a second slot or opening, $a^3$, through which the anchors may be introduced, as shown by dotted lines in Fig. 5², in rear of the tuft. A thin blade, K, hereinafter designated as the "inserter," is arranged to reciprocate longitudinally within the needle, the forward portion of which is grooved to guide the blade and the edges of the anchor, as shown in section in Fig. 5⁸. This blade is retracted until its point is in rear of the openings $a^2$ and $a^3$ previous to the introduction of the tuft and the anchor, and after they are in place the blade is advanced. It drives the anchor against the tuft and forces both the tuft and the anchor through the end of the needle and to their place in the brush-stock, the movement being continued until its beveled or pointed end entering the slot in the anchor expands the same in the manner before explained.

It will be perceived that the tubular needle serves to sustain the tuft and the anchor in proper relation to each other and to guide them to their place in the stock, while the inserter-blade serves the double purpose of driving the tuft and anchor forward and spreading the anchor to fasten the tuft.

I will now describe the machine as a whole, having reference more particularly to Figs. 7, 8, 9, and 10.

The bristles are placed in an upright position in a receiving-box, A, fixed in position on top of a rigid main frame, O, and provided with a follower or pressure-board, $a$, mounted on a sliding guide-bar, $a'$, urged forward by means of a weighted cord, as shown in Figs. 7 and 9, so that it tends constantly to urge the mass of bristles toward the front end of the box and against the teeth of a horizontal endless feeding-chain, B. This chain, which travels around polygonal rolls at its ends, consists of two parallel lines of links jointed together and provided with horizontal needles. The chains travel between stationary cheek-plates or guides $a^5$, and are extended across and beyond the box A, as plainly shown in Figs. 8, 9, and 11', so that their projecting teeth will engage the bristles and feed the latter forward in a continuing stream from the box A toward the punching and inserting devices, hereinafter described.

In order to adapt the machine for the use of bristles of different lengths and to secure their presentation midway of their length to the feeding and inserting devices, I make the bottom of the box or reservoir A adjustable vertically in any suitable manner, preferably by securing it, as shown, to the upper end of a screw, $a^6$, passing through the main frame or other support and fixed by means of nuts $a^4$.

The chains receive an intermitting motion through a ratchet-wheel, $b$, fixed to their forward supporting-roll and actuated by a pawl on the end of a lever, $b'$, moved as hereinafter described, a stop-pawl, $b^2$, being provided to prevent the retrograde motion. In order that the feeding-chains may readily separate the bristles at the front of the mass from the remainder to move them forward, I employ in connection with the chains a horizontally-sliding forked plate, $b^3$. (Plainly represented in Fig. 9.) It will be observed that this plate has on the inner side a pointed finger lying parallel with the inner or active face of the chain at or near the ends of the chain-teeth. This plate is first drawn outward to the right, so that its finger is clear of the bristles, after which it is thrust inward to the left to the position shown in Fig. 9, its finger penetrating the mass of bristles horizontally and separating from the remaining portion the narrow line or body of bristles within reach of the teeth. Being thus divided from the remaining mass, these forward bristles may be readily moved forward by the teeth of the chain. The essence of my invention in this regard consists in employing, in connection with the toothed carrying-chain, a finger or guide to separate the bristles which are moved by the teeth of the chain from those which remain behind. It will be observed that the plate remains in the position represented until all, or substantially all, the bristles within its finger are forward, clear of the receptacle A, after which the movement of the plate is repeated. As the chains move the row or line of bristles forward, they enter a horizontal guide-channel, C, in which they are conducted to the inserting devices. That portion of the passage or channel which is opposite the chain has its outer wall formed by the plates $a^5$, lying between the chains, as before mentioned. These plates are made adjustable horizontally in order to vary the width of the channel according to the size of the tufts to be produced. This adjustment may be obtained by screws and slots, as shown, or in any other equivalent manner. The line of bristles advancing through the channel C is divided at its outer end into tufts and these tufts delivered into the notch in the side of the needle J by a so-called "separating device," (represented in Figs. 7, 8, and 9 and in detail in Figs. 12 to 15,) which vibrates across the end of the channel. It consists of two parts, D and E, of the form represented in Fig. 12, united at their lower end to each other and to the frame by a pivot-pin, $d^5$, and combined with a spring, $d'$, which tends to close them together. An adjustable screw, $d^2$, limits their approach, and a screw, $d^6$, in the frame limits adjustably the outward movement of the member E. The part E is provided with a horizontal slotted portion, $d^{11}$, in its upper end, through which a pointed blade, $d^{12}$, on the part D plays, as shown in the drawings. The adjustment of the screw $d^2$ regulates the distance which the point $d^{12}$ projects beyond the part $d^{11}$.

The separating device as a whole is located at the delivery end of the bristle-passage C and arranged to vibrate across the same and toward the side of the inserting-needle J, which is located adjacent thereto, as plainly shown in Figs. 7, 8, and 9, so that as the inserter moves forward it will separate from the front end of the row of bristles a quantity sufficient to form a tuft and carry the same forward into the notch $a^2$ in the side of the needle, at the same time closing the mouth of the channel C, so that the remaining bristles may not escape therefrom.

The part D extends above its companion and passes at its upper end through one of the plates overlying the chain, the plate being extended, as shown in Fig. 11, to meet the distant wall of the slot in the side of the needle, so that in connection with the needle it prevents the escape of the bristles. The member E terminates at a lower point than the part D, so that it may travel through and across the slot in the under side of the needle. The advancing bristles pass between the parts D and E and are clasped between them while these parts advance toward the needle. The part E is arrested in its outward movement in proper position to form a continuation of the inner wall of the bristle-passage C, as shown in Fig. 11, while the part D continues its outward movement. It is by this action that the parts are separated, so that the bristles may enter and be confined between them. The quantity of bristles removed, and consequently the size of the tuft produced, varies according to the width of the channel C and the length of movement of the part E, which is regulated by the stop-screw $d^6$, before alluded to. The shorter the movement of the part E the greater its separation from the part D and the greater the space afforded between them for the reception of the tuft. The separator is operated by a rod, $d^4$, connected to its member D from a lever, $d^7$, its upper end passing through and being guided by a plate which overlies the carrying-chain, as shown in Fig. 8.

The tubular needle J, into which the tufts are delivered, and which has already been described in detail, is fixed in position on top of the frame, and the inserting blade or needle K is jointed to the upper end of a lever, N, pivoted to the main frame and vibrated as hereinafter described.

The mechanism for cutting the anchors and delivering them into the tubular needle is located on the opposite side from the bristle-feeding devices, as shown in Figs. 8 and 9, and is constructed as follows: The cutting of the anchors is effected by two juxtaposed stamps, I, each consisting of a punch and a corresponding die into which it descends. The first of these stamps forms in the blank strip a notch or incision, operating at the middle of the completed anchor, while the second punch serves to separate the anchors successively from the end of the strip and to give them the notched or serrated edges. The distance from axis to axis of the two punches is equal to two and a half times the width of an anchor plus the waste produced by two successive anchors. The space between the outer part of the second punch and the bottom of the lodgment of the anchor in the tubular needle is equal to the width of three anchors. Each anchor, leaving the second stamp I, serves to push those which precede it forward in succession into the needle J. The metal from which the anchors are formed is commonly soft iron in the form of a narrow strip or tape, and the width varies with the size of the anchors to be produced. This tape is commonly wound on a drum, and is delivered by feeding mechanism, which I will now describe, to the stamping devices. It is necessary, in order that the fixing of the tufts may be effected, that the anchor shall be of uniform width equal to the groove in the needle. To secure this result the feeding of the material to the punches must be rendered positive and uniform. This action I insure by the following mechanism, so constructed that it will be thrown out of action by the slightest slip or failure of the stock to advance in the proper manner.

The mechanism contains as its fundamental features two vibrating levers, F and F', pivoted at their lower ends to the frame, one behind the other, and provided at their upper ends with lateral projections, beneath which the stock-strip Z is carried and against which it is held by the pressure of an underlying block, $f^4$. This block is carried by a pin on its side passing loosely through an oval hole in the upper end of an arm, $f^5$, pivoted to a lever, $f^6$, which is in turn pivoted at one end to the main frame and acted upon at its opposite end by a cam, $f^7$, on the main shaft P, the cam serving, through the intermediate parts, to lift the block $f^4$ and hold the strip in engagement with the arms of the two levers. The lever F receives a positive motion through a connecting-rod, $f'$, and lever $f^2$, driven as hereinafter described.

The lever F' receives motion from the lever F solely through the stock strip or blank. A pawl or dog, $f^3$, pivoted to the upper end of the lever F, engages the lever F', compelling the two levers to retreat in unison, but allowing the lever F to move forward independently of the others. A spring, $z^{12}$, connecting the two levers, compels the lever F' to move forward with the lever F until it encounters a resistance greater than the power of the spring. An arm, $f^8$, is hooked lightly on a shoulder on the upper end of the lever F', and engages with the dog $f^3$ in such manner that when the dog is carried forward by the movement of the lever F, independently of the lever F', the dog $f^3$ will disengage the finger $f^s$ from the lever F'. The finger $f^s$ is connected at its lower end to one end of a lever, $f^{10}$, which is pivoted to the frame and connected in turn at its middle to a rod, $f^{11}$, which is carried downward and hooked normally upon one end of a lever, $g'$. This lever, of angular form, is pivoted to the main frame and connected at its opposite end to a friction-cone mounted on the main shaft P, and through which the shaft receives motion from the driving-wheel H. A spring, $g^5$, connected to the lever $g'$, serves to operate the same and disconnect the clutch-cone when the lever $g'$ is released.

The operation is as follows: The levers F F' having retreated, the block $f^4$ rises against the stock-strip holding it against their heels. While it is held thus, the lever F, moving positively forward, advances the stock-strip before it, the strip in turn serving to pull forward the rear lever, F'. If during this action the strip ceases, for any reason, to advance, the lever F will continue its travel, its heel sliding forward over the strip; but as the lever F' and the piece $f^4$ are moved only by the pull of the strip their advance ceases, and the dog $f^3$, moving forward with the lever F, disengages the finger $f^8$ and allows the lever $f^{10}$ to disengage its catch $f^{11}$ from the lever $g'$, thereby releasing the friction-clutch from the driving-wheel, so that the machine is brought instantly to a state of rest. To restore the connection of the parts and again start the machine, a foot-lever, $g^4$, is pivoted to the frame and connected by a rod, $g^3$, to the end of the lever $g'$, as shown. By means of this foot-lever the lever $g'$ may be re-engaged with the catch $f^{11}$ and the parts restored to their normal and operative position. (Represented in Fig. 8.) A flat spring, $h^2$, secured by a central screw to the front end of the driving-shaft, bears on the face of the driving-wheel H, pressing the latter inward toward the cone and compensating for wear of the parts. The disengagement of the machine may be effected independently of the automatic action by a horizontal pedal, $f^{12}$, pivoted to the frame in position to be operated by the knee of the attendant and arranged to bear against the catch $f^{11}$ in order to press the same out of engagement with the lever $g'$.

In order to secure the proper action of the machine, it is necessary that the brush bodies or stocks shall be properly supported opposite the inserting devices. To this end I provide an automatically-movable support by which the brush-body, regardless of its form or thickness, may be brought gently against the inserting devices and then locked rigidly in position while the tuft is being forced to its place. These devices are constructed as follows, reference being had particularly to Figs. 7 and 9:

On a rigid post or arm rising from and forming part of the frame is mounted a horizontal slide, L, with its forward end opposite the inserting-needle J and connected with devices by which it is automatically moved to and from the needle, as hereinafter explained. To the forward end of this slide is connected, by a horizontal pivot, a plate or anvil, $l$, designed to bear against the back of the brush body or stock $Y^2$ and support the same against the end of the needle J. The pivotal motion of the support $l$ permits it to accommodate itself to the varying shapes of the brush-bodies and to the varying angles at which the tufts may be inserted therein. The rear end of this plate $l$ is provided with worm-teeth engaging a worm, $l^{14}$, mounted in the slide and provided with a spindle by which it may be turned to vary the position of the plate $l$ and fix the same in the required adjustment. The slide L receives its motion through a lever, $l'$, pivoted to the main frame, from a reciprocating bar, M, slotted transversely to receive a crank-pin on the end of the main shaft, the parts being so timed and arranged that the slide L advances with the brush-stock toward the needle J just before the tuft and anvil are ejected from the latter. Inasmuch as the brush stocks or bodies will vary greatly in thickness, it is necessary that the slide shall be advanced with a yielding or elastic pressure. This may be secured by introducing a yielding member in any desired form and at any desired point in the operating mechanism; but I recommend the construction shown in Fig. 7, in which it will be seen that the lever $l'$ is jointed to a block arranged to slide in a horizontal slot in the end of the bar M, which slot carries a spring, $l^{10}$, interposed between the sliding block and the solid portion of the bar. Under this arrangement the slide L will advance until the brush stock or body bears firmly against the end of the needle J, whereupon the yielding of the spring $l^{10}$ will permit the bar M to continue its movement. Inasmuch as the spring $l^{10}$ is insufficient to support the brush-body with the requisite firmness during the insertion of the tuft and anchor, I provide means for automatically and positively locking the supporting-slide L when it is advanced to the proper point. To this end I provide the bar on its under side with a series of ratchet-teeth, $l^{15}$, and pivot to the frame a series of pawls, $l^3$, of different lengths, adapted to engage these teeth and hold the bar forward. These pawls are provided with small stems $l^{11}$, extending downward into sockets in the upper end of a rod, $l^5$, and bearing on springs therein. This rod is connected at its lower end to a lever, $l^9$, mounted on a common axis with the lever $l^7$, which latter bears on the periphery of a cam, $l^8$, on the main shaft. A spring, $l^6$, attached to the frame and to the rod $l^5$, tends to force the pawls upward into engagement with the slide L. During the advance of the support and the brush-block the cam $l^8$ allows the rod $l^5$ to rise under the influence of the spring $l^6$, so that the pawls may engage and hold the slide L. After the insertion of the tuft the cam $l^8$ acts through the intermediate parts to draw the pawls $l^3$ downward out of engagement, so that the slide L may retreat under the influence of the lever $l'$. The essence of my invention in this connection consists in combining with the support for the brush-body devices for moving the same forward with a yielding pressure and devices for locking it rigidly in position; and it is manifest that these devices may be modified in form and detail without changing, essentially, their mode of action.

The principal operative parts hereinbefore described receive motion in the manner following: The main shaft P, already alluded to, is extended through the main frame from side to side, and on the inner end is provided with eccentrics $p^2$, carrying yokes or connecting-rods $q^{12}$, attached to the anvil-forming punches I, as plainly represented in Fig. 8. These connecting-rods are divided transversely, and the parts connected by screws $q^{13}$, which permit the stroke of the punches to be adjusted as required. The lever N, from which the inserter-blade receives its motion, is jointed to the bar M, which receives motion from a crank-pin on the main shaft, as before explained. The lever $d^7$, through which the bristle-separator is operated, is vibrated by a rod, $r$, the lower end of which is attached to or fashioned into a yoke encircling an eccentric, $p$, on the end of the main shaft. The feeding-lever F is connected by a bar, $f'$, to a crank-arm, $f^2$, secured on the shaft or axis of the lever $d^7$, so that it also receives motion from the eccentric $p$. The lever $b'$, carrying the pawl to actuate the bristle-feeding chain, is pivoted to the main frame and slotted transversely at its lower end to receive a pin, $d^{14}$, on the needle-operating lever N. A spring, $b^{16}$, attached to the lever $b'$ and the frame, serves to retract the lever. This arrangement secures the advance of the chain during the retreat of the inserter-blade, and vice versa. A pedal, $h'$, pivoted to the main frame, may be connected by a pitman, $h$, to a crank-pin on the main wheel H as a means of operating the machine by the foot; but it will be commonly operated by a belt applied to the pulley H.

The operation of the machine is as follows: The bristles being placed in the receptacle A in an upright position, subject to the pressure of the follower $a'$, the plate $b^3$ is moved to the right until its finger is entirely withdrawn from the bristles, so that the mass may be urged forward against and between the teeth of the chain. The plate $b^3$ is then pushed inward to the left to the position shown in Fig. 9, so that its finger separates a row or line of bristles from the remainder. The machine being now set in motion and the brush stock or body introduced against the support $l$, the slide L will move forward until the stock is pressed firmly against the front end of the needle J, care being taken by the operator to see that the hole in the stock coincides exactly with the axis of the needle. As soon as the stock bears against the end of the needle the pawls $l^3$ act to lock the slide L and give the stock rigid support. The bristles moving forward under the influence of the chain, through the channel C, encounter at the forward end the separator D E, which at the proper moment advances across the end of the channel toward the needle, separating from the line of bristles in the channel a quantity sufficient to form a tuft, and carrying the same forward into the notch or slot $a^2$, where they stand centrally through and across the needle. The feeding and punching devices now operate to deliver an anchor through the slot $a^3$ from the opposite side of the needle into its bore or opening directly behind the bristles. The inserter-blade K now advances, driving the anchor and the tuft forward, doubling the tuft over the anchor and forcing the two through the forward end of the needle and firmly to their seat in the stock or body. The inserter-blade is now retracted and the slide L is unlocked and retreats from the needle, allowing the operator to move the stock and to bring an empty hole in line with the needle, when the operations are again repeated.

Having thus described my invention, what I claim is—

1. In a brush-machine, the tubular needle having a side opening for the admission of the bristles and an opening in rear of the first for the admission of the anchors to and across its interior, in combination with the thin reciprocating blade or inserter, whereby the anchor may be advanced against the bristles and the latter folded over and driven by the anchor into the brush stock or body.

2. In combination with a reciprocating blade or inserter, the tubular needle provided with longitudinal internal grooves.

3. In a brush-machine, the combination of the tubular needle having the two side openings, the bristle-feeding mechanism arranged to deliver the bristles into the forward opening, the anchor-feeding devices adapted to deliver the anchors into the rear opening, and the reciprocating blade or inserter, whereby the anchors and the bristles are brought together and driven to their places in the brush stock or body.

4. In combination with the tubular needle having the side opening for the bristles, the inserter-blade, the bristle-passage C, and the vibratory separator, whereby the bristles are divided into tufts and the tufts delivered from the passage into the needle.

5. In a brush-machine, the tubular needle, in combination with the punches adapted to produce sheet-metal anchors, the feeder to deliver said anchors into and across the bore of the needle, and the reciprocating blade or inserter to advance said anchors through and beyond the end of the needle.

6. The tubular needle, the inserter-blade therein, the feeder to deliver the bristles into the needle, the punches to form the anchors, the feeder to deliver the anchors into the needle in rear of the bristles, and operating mechanism to move said parts in the described relation, said members constructed and combined for joint operation only, as described.

7. In an organized machine for the manufacture of brushes, the combination of a bristle-inserter, a support for the brush stock or body movable to and from the inserter, and the locking pawl or dog by which the support may be locked against retrograde motion, as described, whereby the stock may be firmly sustained during the insertion of the bristles.

8. In combination with a bristle-inserter, a reciprocating support for the brush stock or body and an operating mechanism therefor, substantially as shown, including a spring through which the motion is transmitted to the support, whereby the machine is adapted to operate on stocks varying in thickness and the stock supported firmly against the inserter without danger of breakage.

9. In combination with the sliding-stock support L, the actuating-lever l', its operating-bar M, the interposed spring, and the crank-pin to actuate the bar M.

10. In combination with the movable support L and the yielding devices for advancing the same, a locking-pawl, l³, and mechanism, substantially as described, for operating said pawls.

11. In combination with the bristle-receiver A and the follower a' therein, the endless toothed chain to advance the bristle.

12. In combination with the receiver A, the follower, and the endless feed-chain, the plate b³, having the finger to pierce the bristles and separate those at the front from the remainder.

13. In combination with the receiver A and the feed-chains traversing its mouth, the longitudinal plates adjustable forward and backward, as described.

14. In combination with a bristle-inserting tool, a channel or passage, C, through which the bristles are delivered laterally, and a divider or separator movable transversely across the end of the channel to separate the tufts and transfer them one at a time to the inserting devices.

15. The divider consisting of the members D E, pivoted and combined with the connecting-spring.

16. In a brush-machine, the combination of a vibrating stock-feeding arm, F, a second arm, F', operated by the pull of the stock-strip thereon, a clutch mechanism through which the machine is driven, a catch to hold said mechanism in action engaged upon arm F', and a device to disengage the catch attached to arm F, whereby any slip or failure of the stock to advance causes the driving-clutch to disengage.

17. In a brush-machine, the two punches I, arranged side by side, the first adapted to incise the edge of the blank strip and the second to separate the anchors from the end of the strip and form teeth in their edges.

18. The feeding device and the tubular needle, with its inserter-blade, in combination with the intermediate anchor-cutting punches, whereby the anchors are automatically formed and delivered into the needle.

19. In combination with a tubular needle, an inserter-blade having a pointed end to expand the anchors or bristle-holding devices.

In testimony whereof I have hereunto set my hand in the presence of the two subscribing witnesses.

JEAN VICTOR GANE.

Witnesses:
ROBT. M. HOOPER,
JOS. B. BOURNE.